United States Patent [19]

Hoeschler

[11] 4,228,000
[45] Oct. 14, 1980

[54] WATER TREATMENT APPARATUS WITH MEANS FOR AUTOMATIC DISINFECTION THEREOF

[76] Inventor: Frank A. Hoeschler, 5840 N. Scottsdale Rd., Scottsdale, Ariz. 85253

[21] Appl. No.: 2,071

[22] Filed: Jan. 8, 1979

Related U.S. Application Data

[63] Continuation-in-part of Ser. No. 603,280, Aug. 11, 1975, abandoned.

[51] Int. Cl.³ .......................... B01J 20/34; B01J 49/00
[52] U.S. Cl. .................................... 210/673; 210/140; 210/190; 210/278; 210/677; 210/678; 210/793
[58] Field of Search ....................... 210/29, 32, 62, 64, 210/80–82, 190, 199, 206, 274, 275, 277, 138–140, 191, 205, 143, 278; 222/190, 444, 630; 422/264, 266, 278, 283

[56] References Cited

U.S. PATENT DOCUMENTS

| | | | |
|---|---|---|---|
| 3,078,224 | 2/1963 | Schulze et al. | 210/82 |
| 3,216,931 | 11/1965 | Dennis et al. | 210/190 |
| 3,420,637 | 1/1969 | Halff et al. | 210/62 |
| 3,425,790 | 2/1969 | Sloan | 210/62 |
| 3,465,880 | 9/1969 | Lyall | 210/190 |
| 3,627,133 | 12/1971 | Rak | 210/190 |
| 4,026,801 | 5/1977 | Ward | 210/190 |

*Primary Examiner*—Ivars C. Cintins
*Attorney, Agent, or Firm*—Herbert E. Haynes, Jr.

[57] ABSTRACT

A water treatment device of the type which automatically regenerates itself at predetermined intervals is provided with a special disinfectant feeder device which dispenses a predetermined amount of disinfectant into the water treating media bed and the device itself to kill the bacteria therein. The disinfectant is dispensed at a predetermined time during the regeneration cycle so that subsequent to its bactericidal action all traces of the disinfectant will be flushed from the treatment device prior to the completion of the regeneration cycle.

13 Claims, 6 Drawing Figures

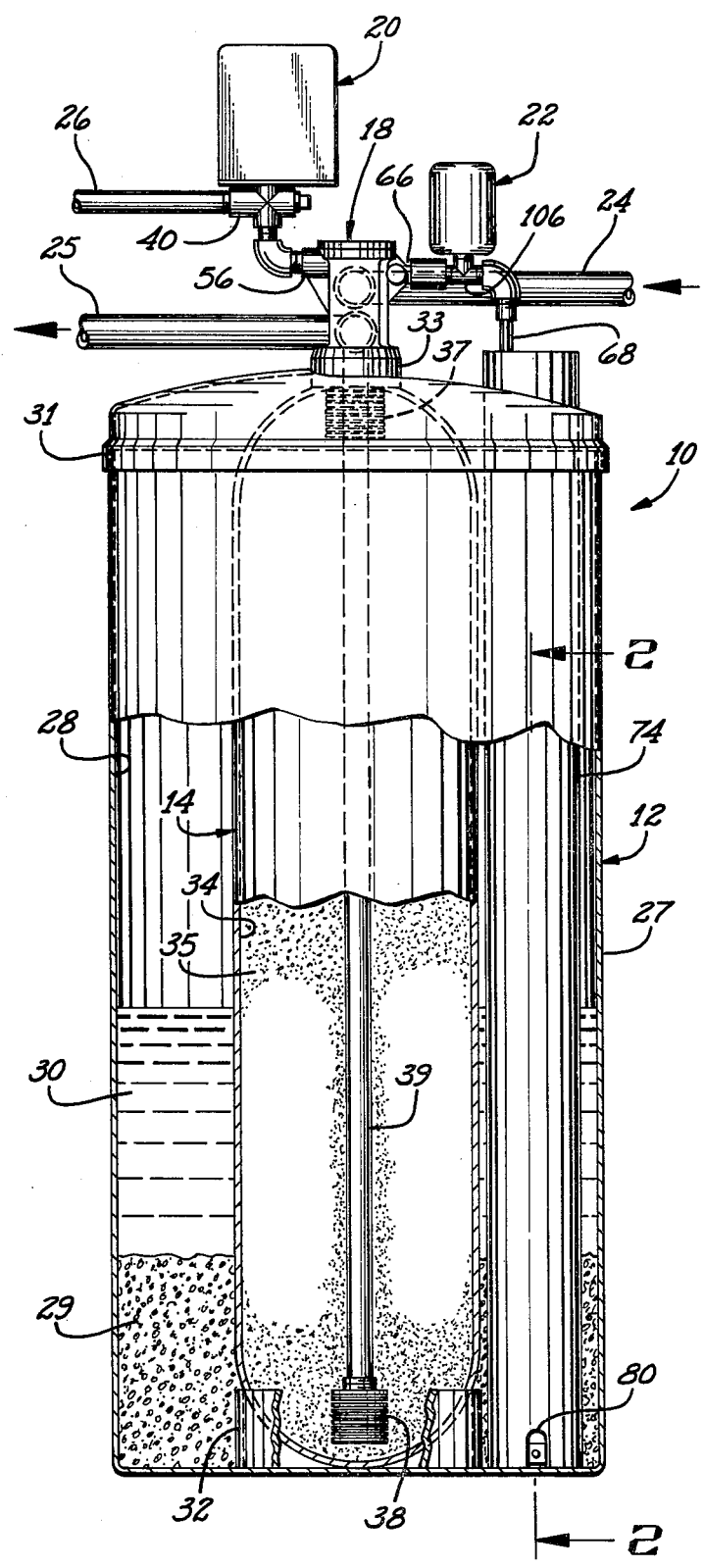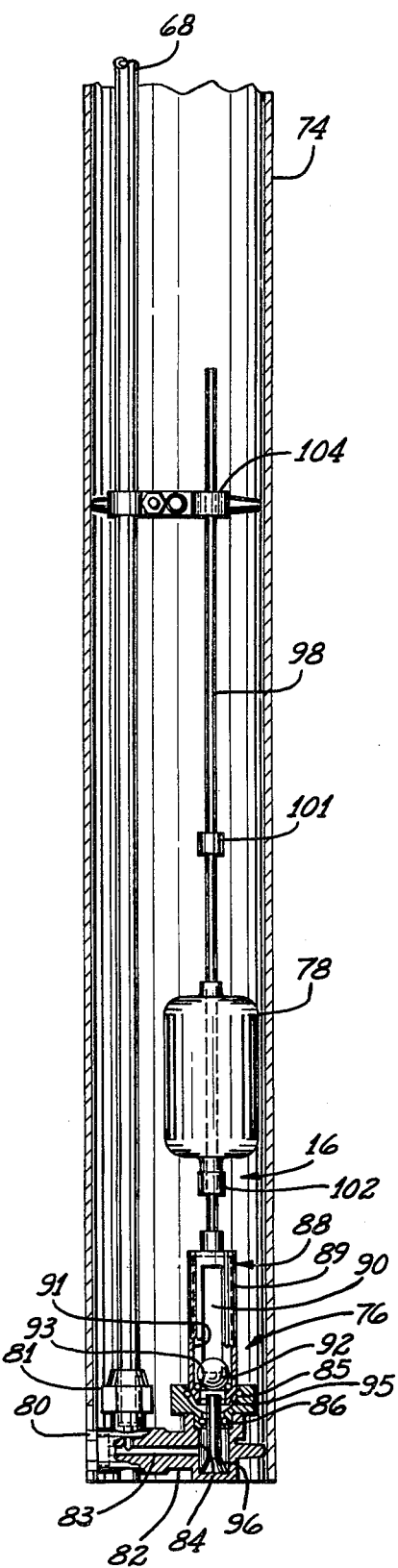
Fig-1
Fig-2

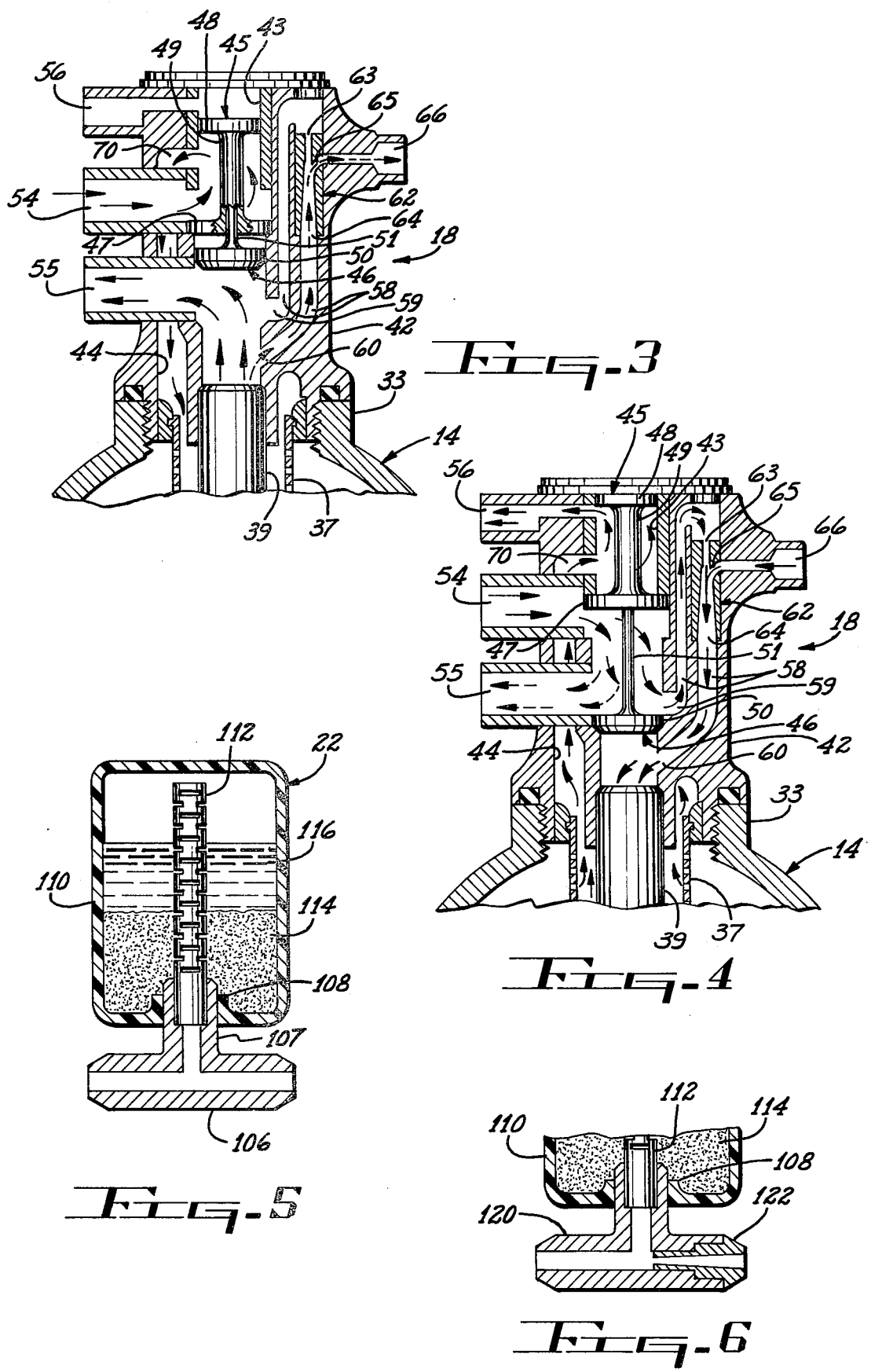

WATER TREATMENT APPARATUS WITH MEANS FOR AUTOMATIC DISINFECTION THEREOF

CROSS-REFERENCE TO RELATED APPLICATION

This application is a continuation-in-part of pending U.S. Patent Application, Ser. No. 603,280, filed Aug. 11, 1975, now abandoned, for WATER TREATING DISINFECTION APPARATUS AND PROCESS, by the same inventor.

BACKGROUND OF THE INVENTION

1. Field of the Invention

This invention relates to water treatment mechanisms and more particularly to water treatment devices including means for automatic disinfection of the devices at predetermined intervals.

2. Description of the Prior Art

Bacteriological contamination of water and other fluids has been officially recognized since the adoption of standards by the United States Public Health Service in 1911. However, only recently have other more potentially serious forms of contamination been suspected. In the last few years, tests have been conducted on inorganics such as heavy metals, and suspected carcinogenics, and on organics such as pesticides, herbicides and the like. With the development of more sophisticated and increasingly sensitive test equipment and procedures, the list of potentially dangerous substances is growing at a rapid rate. For example, the list of potentially dangerous long train molecular compounds is currently estimated at over 17,000.

Bacteriological control has long been accomplished by what has been referred to as a demand/residual principle of disinfection. For example, when bacteria in a domestic water supply is at an unacceptably high level, chlorine is added to the water and the residual chlorine provides a bactericidal action. Recently, the demand/residual principle of disinfection itself has become suspect of contributing to the water quality problem. Clinical experiments have linked chlorine with certain types of heart disease and allegations have been made that it combines with select inorganics to produce carcinogens.

There is a growing belief in the need for abandoning, or at least altering, the residual principle of disinfection.

As is well known, water treatment devices may be in several forms such as for example, filtering devices, dealkalizers, demineralizers, water softeners and the like, and the following although described in regard to water softeners in particular, will be understood to apply to any water treatment device of the type in which water is passed through a media bed for treatment purposes.

In the case of water softeners in particular, the media bed is usually in the form of an ion exchange resin, and raw water, normally supplied from a municipal water plant is passed through the bed and a chemical interaction occurs so that the hardness components in the water, such as calcium and magnesium ions are replaced by other ions such as sodium. After a period of time, the softening capability of the bed will become exhausted and the medium will have to be rejuvenated and such is normally accomplished by passing a brine solution through the bed, as will hereinafter be discussed.

Since by law, potable water can contain a number of harmless bacteria indigenous to municipally treated water, the potential for a build up or growth of such bacteria trapped in the tank and treatment bed of water softeners does exist. The relatively low level of bacteria in municipally treated water along with the organic compounds normally present in the water become trapped in the tank and in the water treatment bed. The organic compounds provide a nutrient for the bacteria thus turning the tank and the treatment bed into a breeding ground for bacterial growth.

Bacterial levels in water softeners, and in other water treating devices, are not a linearly escalating problem in that the bacteria level will decrease somewhat after each period of water flow and after each regeneration cycle. However, this alone will not control bacteriological contamination in that water softeners, particularly those located in private residences, are subject to long periods of nonflow, such as overnight and during vacation periods. For many years however, this flushing along with the residual disinfection provided by municipalities, was all that was accomplished in the line of bacteriological contamination control, in that the water softener and other treatment devices being a contributing factor to an already less than ideal water quality problem, was not recognized by the public, industry, or regulatory agencies.

The problem of water treatment systems acting as a bacteria breeding ground was recognized as a result of the water softening industry attempting to upgrade its equipment and service. Such upgrading occurred as a result of the unpleasant odors and tastes of the water in many parts of the country, such as those well known to accompany water that has been chlorinated by a municipality. To overcome this objectionable odor and taste problem, the water softening industry started incorporating a filter medium, such as activated carbon, in the water treatment bed, and such a water softener was renamed a water conditioner. However, the filter medium itself proved to be an excellent bacteria breeding ground, and the existing problem was compounded by such filter mediums and the fact that softeners and the other water treatment devices act as a breeding ground soon became recognized as a problem.

The next step in the development of the water softening art resulted upon recognition of the above described problem, and that step included the incorporation of a bactericidal disinfectant in the filter medium. The bactericidal disinfectant in most common usage today is a silver impregnated carbon which thus combines the filtering and the bactericidal functions into a single compound placed in the treatment bed of the water conditioner system itself. The filter/bactericidal medium is of such a nature that it requires periodic replacement and this leaves the water softening industry with two basic types of systems. The first of these basic types of systems is a fixedly installed self-regenerating system in which the ion exchange resin bed is automatically rejuvenated at predetermined intervals by hydraulically isolating the bed from the downstream portion of the water supply system and back flushing the bed with a brine solution and following the brine solution with a water rinse and then hydraulically coupling the rejuvenated bed back into the water supply system. Such a system does not normally include a filter/bactericidal medium due to the undesirable bacterial breeding capabilities of the filter medium and the need for replenishing the bactericidal medium due to its sacrificial type of usage. Thus, it will be seen that such in situ systems rely solely on the flushing of bacteria from the tank and the residual chlorine added by the municipality.

The second, and more common system currently being employed is one wherein the entire water treatment media tank and its contents are replaced periodically by a water servicing company. Such a system is fully disclosed in U.S. Pat. No. 3,078,224, and operates as follows: briefly, the tank containing the water treatment media bed and the filter/bactericidal medium is mounted in a building's water supply system by suitable quick disconnect fittings, and at predetermined intervals, depending on usage, a water service company will replace the spent tank with a regenerated tank. The spent tank is then transported to a central facility where a plurality of such tanks are emptied into a large vessel for batch regeneration and disinfection of the water treating media. The filter/bactericidal medium is removed and discarded during the batch regeneration cycle. The regeneration is accomplished by flushing with a brine solution and the disinfection is accomplished by a chlorine rinse and soft water is used as a final rinse. When these steps have been accomplished, the individual tanks are then refilled, a new supply of filter/bactericidal medium is added and the tanks are then ready for reuse.

This second type of prior art system, while being somewhat of an improvement over those systems which relied solely on flushing for control of bacterial contamination, are quite costly and inconvenient from a customer's standpoint, and are less than a completely satisfactory answer to the bacteriological contamination problem with regard to the water conditioning art. In the first place, the need for periodically opening a building's water distribution system for tank replacement purposes, subjects the system and the tanks themselves to the introduction of airborne bacteria and other contaminants. Secondly, the tank replacement interval is not something which occurs automatically at regular intervals, but is subject to varying work load requirements, delivery problems, scheduling delays, and the many factors which can cause the service company to interrupt or delay tank replacement. In the event that tank replacement is excessively delayed, the system can, at best, become totally ineffective and in some instances, can contribute significantly to the bacteriological contamination problem due to the fact that the filter medium and the water treating medium are excellent breeding grounds. Thirdly, since the system operates on the residual disinfection principle, that in and of itself is suspect as hereinbefore discussed, in that far too little is known relating to the combining of bactericidal disinfectants with the many and varied substances that may be contained in the water being treated.

Therefore, the need exists for a new and useful apparatus and method for automatic disinfection of water treatment equipment and the treatment bed thereof, which overcomes some of the problems and shortcomings of the prior art.

SUMMARY OF THE INVENTION

In accordance with the present invention, an apparatus and method for automatically disinfecting water treating media and equipment is disclosed. The apparatus is in the form of an automatically regenerating water treatment apparatus which is fixedly installed in a building's water supply system and is connected to the building's sewer line or other discharge system. The water treatment apparatus may be in the form of a water softening device and may also include a filtering medium, in any event, the water treatment apparatus includes a flow switching valve that is controlled by a suitable timing device to switch the water conditioning apparatus between a water treating operational mode and a regenerating operational mode.

In the water treating mode of a water softener, raw water is directed by the flow switching valve from the supply segment of a pressurized water line through a water treating media which may include for example, an ion exchange resin and a carbon filtering medium, contained within a media tank and is routed back through the switching valve into the delivery portion of the building's water supply system. At the very beginning of the water treating mode of operation, a portion of the incoming raw water is directed through a regenerating line into a regenerating agent storage tank to form a saturated solution of the regenerating agent therein. The flow of water in the regenerating line is controlled by a float operated two position shutoff valve, which is located in the regenerating agent storage tank, and the valve shuts off the water flow when a predetermined amount is in the storage tank. When this shutoff action takes place, a predetermined amount of water under pressure in the regenerating line enters into a disinfectant dispenser vessel that is coupled to the regenerating line. The water in the disinfectant vessel reacts with a disinfectant in solid form to dissolve some of that disinfectant and form a saturated solution of disinfectant.

After a predetermined time, the timing device actuates the flow switching valve to place the water treatment apparatus in the regenerating mode. In the regenerating mode, the incoming raw water is directed from the supply segment of the water line by the flow switching valve directly into the delivery segment of the building's water supply to achieve hydraulic isolation of the water conditioning apparatus. A relatively small portion of that incoming raw water is directed through the water treating media in a reverse, or back wash direction, and that water is returned to the flow switching valve and is routed thereby into the building's disposal or sewer line. When this regenerating operational mode begins, the flow switching valve exerts a reduced static pressure on the regenerating line which simultaneously draws the disinfectant agent solution from the disinfectant vessel, and the regenerating agent solution from the storage tank and mixes them with the back wash water to cause them to enter into the water treatment media, and the apparatus in general. The disinfectant solution kills any bacteria in the water treatment apparatus and the regenerating agent rejuvenates the treatment media. The quantity of the disinfectant agent solution is considerably smaller than the quantity of the regenerating agent solution, therefore, the disinfection action takes place at the first portion of the regenerating cycle, and subsequent flow of the regenerating agent solution will start rinsing the disinfectant solution from the water treatment apparatus. When the supply of regenerating agent solution is exhausted, water continues to flow in a backwash direction through the water treating media and the media tank. This back washing flow of water rinses all traces of the disinfectant solution and the regenerating agent solution from the water treatment apparatus, and the switching valve then, under control of the timing device, returns the water treatment apparatus to the water treating operational mode.

From the above, it will be seen that the apparatus of the present invention is a device which automatically disinfects the water treating media and the treatment apparatus itself at predetermined intervals to prevent the media and the apparatus from becoming a bacterial breeding ground. Since the disinfectant solution is completely purged from the water treatment media and the apparatus during the regenerating cycle, no residual type of disinfection is possible and thus, nothing is added to the building's water supply. Further, since the apparatus does not require that the building's water supply system be opened to accomplish the disinfection and/or media rejuvenation, the system is kept closed at all times and this eliminates the possibility of airborne bacteria or other contaminants from being introduced into the system.

Accordingly, it is an object of the present invention to provide a new and improved water treatment apparatus and method for automatically disinfecting the water treating media and the apparatus.

Another object of the present invention is to provide a new and improved fixedly installed water treatment apparatus for automatically disinfecting the water treating media and the apparatus itself at predetermined intervals to prevent the media and the apparatus from becoming bacterial breeding grounds.

Another object of the present invention is to provide a new and improved fixedly installed water treatment apparatus of the above described type wherein the disinfection of the water treating media and the apparatus is automatically accomplished in situ within a building's water supply plumbing system during regeneration operational modes of the apparatus when the apparatus is hydraulically isolating from the delivery segment of the building's water supply system.

Another object of the present invention is to provide a new and improved fixedly installed water treatment apparatus of the above described character which allows the use of a filter medium as part of the water treatment media due to the automatic periodic disinfection procedure which prevents the filter medium, the water treatment media and the apparatus from becoming bacterial breeding grounds.

Another object of the present invention is to provide a new and improved fixedly installed water treatment apparatus of the above described type wherein the disinfection of the water treating media and the apparatus occurs at the beginning of the regeneration cycle to insure that complete flushing of the disinfectant is accomplished prior to returning of the apparatus to the water treating operational mode.

The foregoing and other objects of the present invention, as well as the invention itself, may be more fully understood from the following description when read in conjunction with the accompanying drawings.

BRIEF DESCRIPTION OF THE DRAWINGS

FIG. 1 is an elevational view of the water treatment apparatus of the present invention with portions thereof broken away to illustrate the various features thereof.

FIG. 2 is an enlarged fragmentary sectional view taken on the line 2—2 of FIG. 1.

FIG. 3 is a sectional view in schematic form of the flow switching valve illustrating the valve's position when the water treatment apparatus is in its water treating operational mode.

FIG. 4 is a view similar to FIG. 3 and showing the position of the flow switching valve when the water treatment apparatus is in the regenerating operational mode.

FIG. 5 is an orthographic sectional view of the disinfectant dispenser vessel which forms part of the water treatment apparatus of the present invention.

FIG. 6 is an enlarged fragmentary sectional view similar to FIG. 3 but illustrating a modification thereof.

DESCRIPTION OF THE PREFERRED EMBODIMENT

Referring more particularly to the drawings, FIG. 1 illustrates the water treatment apparatus of the present invention which is shown in the form of a water conditioner and is indicated in its entirety by the reference numeral 10. As will hereinafter be described in detail, the apparatus 10 includes the major components of a regenerating agent storage tank 12, a water treating media tank 14, a float operated shutoff valve assembly 16 (FIG. 2), a flow switching valve 18, a timing device 20, and a disinfectant dispenser vessel 22. As is customary in the art of self-regenerating water conditioner devices, the apparatus 10 is fixedly coupled into a building's plumbing system, which is shown in part as including a supply segment in the form of a raw water inlet line 24, having one end connected to the flow switching valve 18 with its other end (not shown) coupled to, for example, a municipal water supply, and a delivery segment in the form of a treated water outlet line 25, having one end connected to the flow switching valve 18 with its other end (not shown) being coupled to the building's water delivery system. The flow switching valve 18 of the apparatus 10 is also connected, by means of a dump line 26, into the building's disposal system (not shown).

It will be noted that the apparatus 10 is shown in the form of a water softener or water conditioner, however, it will be understood that other forms of water treatment devices such as filters, dealkalizers and the like can be operated in accordance with the principles of the present invention as will hereinafter be described. Further, it will be noted that the particular water conditioning apparatus illustrated may differ in many of its structural details, physical arrangement of the components and the like, and the particular arrangement and details shown, and hereinafter described, are not to be construed as limitations of the present invention. For example, the water treating media tank 14 is shown as being contained within the regenerating agent storage tank 12, and that arrangement, although being customary in the art, is not a mandatory arrangement in that those tanks may be physically separated from each other with the required interconnections being made with suitable plumbing lines (not shown).

The regenerating agent storage tank 12 includes a housing 27 preferably of cylindrical configuration and defining an internal chamber 28 for containing a supply of regenerating agent 29 such as sodium chloride in solid form. At specific times during operation of the apparatus 10, as will hereinafter be described, a predetermined amount of water is admitted to the chamber 28 and will react with the salt 29 to form a saturated brine solution 30. The housing 27 is formed with an open top to provide access to the internal chamber 28 for regenerating agent replenishment purposes, and a suitable lid 31 is demountably positioned atop the housing 27.

A pedestal 32 is provided in the bottom of the chamber 28 of the housing 27 for supporting the base of the water treating media tank 14. The media tank 14 is preferably of cylindrical configuration and is provided with an internally threaded boss 33 at its upper end for threadingly receiving the flow switching valve 18 and its associated water distributing devices will hereinafter be described. The media tank is formed with an internal chamber 34 for containing a water treating media 35. The water treating media 35 is preferably an ion exchange material, such as natural or synthetic zeolites or an ion exchange resin. In addition to the ion exchange material, the water treating media 35 may also contain a filtering material (not shown) such as activated carbon which filters objectionable odors and tastes out of the water being conditioned by the apparatus 10.

Raw water under pressure is supplied to the apparatus 10 by means of the inlet line 24 as hereinbefore mentioned, and when the apparatus is in the water conditioning operational mode, the water will pass through the flow switching valve 18 and emerge therefrom through a suitable distributor head 37 that is dependingly attached to the lower end of the valve 18 so as to be located in the upper portion of the media tank 14. The distributor head 37 is a cylindrical structure having a plurality of slots formed in its peripheral surface so that water emerging therefrom will be distributed evenly at the top of the treatment media 35. The emerging water passes downwardly through the media 35 and in doing so, its hardness compounds, such as calcium and magnesium ions are replaced by other ions such as sodium in accordance with the well known ion exchange principle. In the circumstance where the water treating media 35 also contains a filtering media, such as the hereinbefore mentioned activated carbon, the downwardly moving water will also be filtered to remove the objectionable odors and tastes. Upon reaching the bottom of the media tank 14, the conditioned water will enter into a collector head 38 which is configured similar to the distributor head 37, in that it is cylindrical in configuration and is formed with a plurality of peripherally disposed slots which prevent the media 35 from entering therein. The collector head 38 is attached to the lowermost end of a pipe 39 which is coaxially disposed within the tank 14 and has its upper end passing through the distributor head 37 and is in communication with the flow switching valve 18. The conditioned water which enters into the collector head 38 passes upwardly through the pipe 39 and is directed through the flow switching valve 18 to the delivery segment, i.e., the water outlet line 25, which distributes the water to various locations in the building (not shown).

The above described water conditioning operational mode is the normal mode of the apparatus 10 and it will be in this mode the largest percentage of the time. However, the water treating media 35 will become contaminated with foreign matter and will lose its ion exchanging capabilities in time as determined by the amount of water conditioned by the apparatus. Therefore, at predetermined intervals, the apparatus 10 is automatically switched from the water conditioning operational mode to the regenerating operational mode. In a typical domestic installation, the apparatus 10 will be automatically switched to its regenerating operational mode every 48 hours, and regeneration takes about 40 minutes. However, these figures are only samples in that the various water conditioning devices and installations may vary and thus the times will vary.

The timing device 20 is normally a clock mechanism which is set to operate a motorized shutoff valve 40 (FIG. 1) that is connected in the dump line 26 leading from the flow switching valve 18 to the building's disposal system (not shown). During the water conditioning mode, the shutoff valve 40 is positioned to close the dump line 26, and as will hereinafter be described, closing of the dump line results in hydraulic positioning of the flow switching valve 18 so that it will result in the apparatus 10 operating in the water conditioning mode as described above. When it is time to switch the apparatus 10 into its regenerating mode, the timing device 20 operates the shutoff valve 40 which results in hydraulic repositioning of the flow switching valve 18.

The flow switching valve 18, as seen in FIGS. 3 and 4, includes a body 42 having an inner axial bore 43 and an outer coaxial bore 44 formed therein. A slide valve 45 and a poppet valve 46 are slidably mounted in the inner axial bore 43 which is closed at its upper end and has the pipe 39 coaxially fitted in its lower end. The outer coaxial bore 44 has the distributor head 37 fitted in its lowermost end and has its upper end in communication with the inner axial bore 43 as will be hereinafter be described. The slide valve 45 is of cylindrical configuration having a lower head 47 and a spaced upper head 48 which are interconnected by a reduced diameter stem 49. The stem 49 is provided with a blind bore formed therein which opens onto the lowermost face of the lower head 47 of the slide valve. The poppet valve 46 is formed with a head 50 from which a valve stem 51 extends axially, and the valve stem 51 is slidably mounted in the blind bore of the stem 49 of the slide valve. The valve body 42 is provided with an inlet port 54, an outlet port 55 and a dump port 56, all of which are in communication with the inner axial bore 43 at various locations along the length thereof. The valve body 42 is also provided with a passage 58 which extends from a first port 59 in a looped configuration to a second port 60, with both of those ports opening into the inner axial bore 43 at spaced apart locations. The loop passage 58 has an injector nozzle 62 disposed therein with the nozzle having an axial bore which defines an inlet passage 63, an enlarged tapered outlet passage 64, and a branch line 65 which extends into the axial bore proximate the junction of the inlet and outlet passages thereof. The branch passage communicates with a regeneration port 66 which, as seen in FIG. 1, is coupled to a regeneration line 68 as will hereinafter be described in detail.

When the flow switching valve 18 is positioned as shown in FIG. 3, as a result of closing of the motorized shutoff valve 40 and the resulting hydraulic forces, the apparatus 10 will be in the water conditioning operational mode. Incoming raw water under pressure is directed, by virtue of slide valve and poppet valve positioning, into the inner axial bore 43 of the valve body 42 and will pass through a lateral port 70 into the outer coaxial passage 44 and will exit the valve body through the distributor head 37 into the media tank 14. After passing through the media 35 the water will now be conditioned, as hereinbefore described, and will move upwardly through the pipe 39 and will exit the valve body 43 through the outlet port 55 thereof.

As will hereinafter be described, during the initial part of the above described water conditioning operating mode, conditioned water returning to the flow switching valve 18 will flow into the loop passage 58 of the valve body 42 and will pass through the regeneration port 66 into the regeneration line 68.

When the flow switching valve 18 is positioned as shown in FIG. 4, as a result of opening of the motorized shutoff valve 40 and the resulting hydraulic forces, the apparatus 10 will be in the regenerating operational mode. Raw water under pressure in the supply segment of the water line will enter the valve body 42 through the inlet port 54 which is in direct communication with the outlet port 55 due to the position of the slide valve 45 and the poppet valve 46. It will be understood that such direct communication of the inlet and outlet ports is provided so that the water supply to the building (not shown) will remain uninterrupted. However, the regeneration cycle of the apparatus 10 is usually accomplished when the demand for water is at a minimum, such as late at night. Therefore, very little or no flow will occur in this direct pass-through path. The incoming raw water will instead, pass into the loop passage 58 through the port 59 thereof, through the injector nozzle 62, out the port 60 of the passage 58 and down through the pipe 39 to the bottom of the media tank 14. The water will then percolate upwardly through the media 35 and will enter into the distributor head 37 and into the outer coaxial bore 44 of the valve body, and is then directed to the dump port 56 for disposal in the building's disposal system (not shown).

The flow of water through the injector nozzle 62 will operate in accordance with Bernoulli's principle which states in effect, that fluid flowing through a venturi will increase in velocity and decrease in pressure. Thus, water flowing through the inlet passage 63 into the outlet passage 64 of the injector nozzle 62 will cause a reduction in the static pressure proximate the outlet of the inlet passage 63, and that reduction in pressure will be felt in the branch passage 65 of the nozzle 62, in the regeneration port 66 and the regeneration line 68. As will hereinafter be described in detail the reduction in pressure produced within the injector nozzle 62 will cause a fluid flow into the injector nozzle through the branch passage 65 thereof, and that fluid will be mixed with the raw water that is being directed into the media tank 14.

As seen in FIGS. 1 and 2, the regeneration line 68 extends from the regeneration port 66 of the flow switching valve 18 downwardly into a standpipe 74 and is connected to a two-position shutoff valve 76 which is operated by a float mechanism 78. The standpipe 74 is preferably of cylindrical configuration and is open at its top to ambient and is open at its bottom by means of a radial slot 80 so that the interior of the standpipe 74 is in communication with the internal chamber 28 of the regenerating agent storage tank 12. The two position shutoff valve 76 includes a valve body 82 having an axial passage 83 formed therein, with one end of that passage being in communication with the regeneration line 68 by means of a suitable fitting 81. The opposite end of the axial passage is in communication with a vertical bore 84 formed in the valve body 82, and that bore 84 is open at the top and is formed with an upper valve seat 85 and a spaced lower valve seat 86. In addition to the valve body 82, the two position shutoff valve 76 also includes a plunger valve 88. The plunger valve 88 includes a hollow cylindrical body 89 with open slotted sides as at 90 and a bore 91 in which a buoyant ball valve 92 is freely axially movable between a downwardly disposed position where it is seated on a shoulder 93 formed in the bore of the body 89, and an upwardly disposed unseated position. The bottom of the cylindrical body 89 is provided with a plurality of axially extending apertures formed therethrough, and a bevelled surface 95 is formed on the external lowermost edge of the body 89. A poppet valve 96 depends axially from the cylindrical body 89, and an elongated rod 98 extends axially upwardly from the body 89. The rod 98 has the float 78 axially slidably mounted thereon for movement between an upper stop sleeve 101 and a lower stop sleeve 102.

The upper end of the elongated rod 98 of the plunger valve 88 is slidably supported in a bracket assembly 104 that is suitably positioned within the standpipe 74. The bracket assembly 104 holds the plunger valve 88 in axial alignment with the vertical bore 84 of the valve body 82, with the cylindrical body 89 disposed immediately above the vertical bore 84, and the poppet valve 96 located within the vertical bore 84. The plunger valve 88, including the cylindrical body 89, the poppet valve 96, and the rod 98, move as a single entity under the influence of the float 78 as will hereinafter be described, and that movement is along a vertical axis which is coincident with the axis of the vertical bore 84 formed in the valve body 82.

When water under pressure is supplied to the regeneration line 68, as hereinbefore mentioned in the above description relating to the water conditioning operational mode of the apparatus 10, the water will move into the axial passage 83 of the valve body 82 and into the vertical bore 84 thereof. The water under pressure will then move upwardly through the apertures formed in the bottom of the cylindrical body 89 and will move the ball valve 92 away from the shoulder 93 formed in the bore 91 of the cylindrical body 89. The water will thus flow out of the valve body 82 through the open slotted sides 90 of the cylindrical body 89 and into the standpipe 74 and into the internal chamber 28 of the storage tank 12. When the water level in the storage tank 12 and in the standpipe 74 reaches the float 78, it will slidably move the float upwardly toward the upper stop sleeve 101, whereupon, the entire plunger valve 88 will move upwardly until the poppel valve 96 moves into seated engagement with the lower valve seat 86 formed in the valve body 82, and with the poppet valve so seated, the flow of incoming water will thus be shut off.

The water thus supplied to the internal chamber 28 of the regenerating agent storage tank 12 will react with the solid regenerating agent, i.e., salt, and form a saturated regeneration agent solution, i.e., brine.

When the apparatus 10 is switched into its regenerating operational mode as described, a reduction in the static pressure is felt in the regeneration line 68, and thus also in the passage 83 and the bore 84 of the valve body 82. The reduced pressure will move the poppet valve 96 off of the lower valve seat 86 of the valve body, and the saturated brine solution will flow through the valve body 82, through the regeneration line 68 to the flow switching valve 18 where it is mixed with the water being supplied to the media tank 14 as hereinbefore described. When the liquid level falls within the storage tank 12 and the standpipe 74, the float 78 will slide down on the rod 98 into engagement with the lower stop sleeve 102 and the entire plunger valve 88 will move downwardly as an entity until the bevelled surface 95 of the cylindrical body 89 moves into seated engagement with the upper valve seat 85 formed in the valve body 82 and the ball valve 92 moves into seated engagement with the shoulder 93 formed in the bore 91 of the cylindrical body 89.

It will now be seen from the above that the two position shutoff valve 76 allows water to flow into the storage tank at the beginning of the water conditioning operational mode and will shut off that inflow when a predetermined amount of water has been admitted to the tank 12, and will allow the brine to flow out of the tank 12 at the beginning of the regenerating operational mode and will shut off this outflow when the brine has been removed from the storage tank 12. This type of operation places the regeneration line 68 under pressure throughout the water conditioning mode, and places the regeneration line 68 under reduced static pressure throughout the regeneration mode.

As seen in FIG. 1, the disinfectant dispenser vessel 22 is located in the regeneration line 68 and, as hereinafter will be described in detail, will therefore be subjected to the pressurization and reduced static pressure felt in the regeneration line 68.

The disinfectant dispenser vessel 22, as seen best in FIG. 5, is connected in the regeneration line 68 by a tee 106 with one branch 107 of that tee being threadingly affixed in a boss 108 formed in the bottom of the vessel body 110. The branch 107 of the tee 106 is especially configured so that a tubular distributor screen 112 is mounted thereon so as to extend axially from the branch 107 and axially up into the vessel body 110. The vessel body 110 is preferably of cylindrical configuration and is fabricated of a suitable chemically inert material, such as polyvinyl chloride, and may be formed of transparent or translucent material if desired, to facilitate visual inspection of the disinfectant agent as will become apparent as this description progresses. The vessel body 110 is closed with the exception of the boss 108 formed in the bottom thereof, since the boss is closed by virtue of the tee 106, the vessel body 110 is a sealed leakproof container when operatively coupled into the apparatus 10.

The disinfectant dispenser vessel 22 contains a soluble disinfectant agent 114 in solid form, with the agent being any halogen, and preferably being iodine for its well known bactericidal action which takes place within a relatively short time period. In a typical installation, the dispenser vessel 22 is preferably sized to contain enough of the disinfectant agent 114 to last for a year in normal operation of the apparatus 10.

In operation, when the water being supplied to the storage tank 12 during the initial period of the water conditioning operational mode of the apparatus 10, is shut off by the two-position valve 76, the pressure in the regeneration line 68 will increase slightly due to the closing of the valve 76. This increase in line pressure will force water into the disinfectant dispenser vessel 22, and water flow will continue until the pressure of the entrapped air in the vessel equals that of the water in the regeneration line. Thus, a predetermined amount of water will enter into the vessel 22, and will react with the disinfection agent 114 therein to form a saturated solution 116 of that agent.

When the apparatus 10 is switched into its regenerating operational mode, the reduced pressure felt within the regeneration line 68 will simultaneously draw the brine solution out of the storage tank 12 and the disinfecting solution out of the dispenser vessel 22. Since the quantity of the disinfectant solution is considerably less than the quantity of the brine, the disinfection solution will be completely dispensed at the very beginning of the regeneration cycle. This is very important in the operation of the apparatus 10 in that the disinfectant solution is directed into the media tank 14 at the very beginning of the regeneration cycle and flushing of the disinfecting solution commences immediately. The flushing of the disinfecting solution is initially accomplished by the brine and will continue for the full term of the regenerating cycle in that the water which is employed to flush the brine out of the apparatus will completely purge all traces of the disinfecting agent from the apparatus. Thus, it will be seen that the disinfecting agent will perform its intended bactericidal action on the media 35 and the apparatus 10 itself only, and since no residual disinfectant will remain when the apparatus is switched back into its water conditioning operational mode, the disinfectant solution can be of greater concentration that would otherwise be possible to insure a complete and rapid bactericidal action. In the event of any apparatus malfunction, the presence of a salt taste in the water conditioned by the apparatus will provide an immediate warning that some malfunction has occurred, and that some of the disinfecting agent may possibly still be present in the apparatus. The above description of the apparatus 10, having the disinfectant vessel 22 mounted therein, will be understood to apply to the majority of water conditioning devices on the market today. However, other types of water conditioning devices are known to exist. For example, the apparatus 10 is shown and described as having a water flow down into the media tank 14 during the water conditioning mode, and up through the tank in the regenerating mode. This water flow is reversed or in some devices is a combination of the flow directions in some known water conditioning devices. Another example known to exist, is a water conditioner device which does not include a flow switching valve 18 as described above. In such devices water flow into the regenerating agent storage tank, and withdrawal of the regenerating agent solution is accomplished with a pump (not shown).

Therefore, to accommodate water conditioning devices (not shown) where a pump is used in place of the flow switching valve 18, the disinfectant dispenser vessel may be modified as shown in FIG. 6. In this embodiment, the dispenser vessel body 110, distributor screen 112 and the agent 114 all remain the same with a special tee 120 replacing the above described tee 106. The speical tee 120 is formed with an injector nozzle 122 therein so that the brine flowing through the nozzle during the regeneration cycle will produce the required reduced static pressure in the tee 120.

Although the above description relates in particular to a water softener or water conditioner apparatus, it is to be understood that all water treatment devices, of the type in which water is passed through a media bed and includes an automatic regenerating cycle, may be operated in accordance with the principles of the present invention. For example, a filtering treatment apparatus (not shown) will have no need for a regenerating agent storage tank and its only purpose for having a regenerating cycle is to flush trapped contaminants from the filtering media bed. Therefore, at the beginning of the filtering operational mode of such an apparatus, water is directed to the disinfectant vessel only, and at the beginning of the regenerating operational mode, only the saturated solution of disinfectant agent is mixed with the backwash or flushing water.

While the principles of the invention have now been made clear in an illustrated embodiment, there will be immediately obvious to those skilled in the art, many modifications of structure, arrangement, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A water treatment apparatus of the type which is fixedly mounted between the supply segment and the delivery segment of a pressurized water line comprising:
   (a) a media tank having a water treating medium therein;
   (b) switching means coupled to said media tank for hydraulically coupling said media tank between the supply and delivery segments of the water line to provide a water treating operational mode in which the water is passed through the media tank for treatment purposes, said switching means periodically hydraulically isolating said media tank from the delivery segment of the water line to provide a water treatment media regenerating operational mode in which the water is directed to the media tank for regenerating purposes said switching means adapted to repeatedly cycle between the water treating and the media regenerating operational modes;
   (c) a disinfectant dispenser vessel coupled to said switching means for enclosingly containing a water soluble disinfectant agent in solid form; and
   (d) said switching means and said dispenser vessel cooperatively operative to automatically direct a predetermined amount of water into said dispenser vessel at the beginning of each cycle of the water treating operational mode for dissolving a portion of the water soluble disinfectant agent therein to form a saturated solution thereof and to automatically and subsequently extract said solution of disinfectant agent from said dispenser vessel at the beginning of each cycle of said regenerating operational mode and mix it with the water being directed to the media tank for regenerating purposes.

2. A water treatment apparatus as claimed in claim 1 wherein said disinfectant dispenser vessel comprises:
   (a) a vessel body having an interior compartment for containing the water soluble disinfectant agent in solid form, said vessel body being closed and having a boss formed therein;
   (b) fitting means mounted in the boss of said vessel body for coupling thereof to said switching means; and
   (c) screen means mounted between said fitting and the interior compartment of said vessel body for retaining undissolved portions of said water soluble disinfectant agent in said vessel body.

3. A water treatment apparatus as claimed in claim 1 wherein said water soluble disinfectant agent is a halogen.

4. A water treatment apparatus of the type which is fixedly mounted between the supply segment and the delivery segment of a pressurized water line comprising:
   (a) a media tank having a water treatment medium therein;
   (b) switching means coupled to said media tank for hydraulically coupling said media tank between the supply and delivery segments of the water line to provide a water treating operational mode in which water is directed through said media tank for treatment purposes and for periodically hydraulically isolating said media tank from the delivery segment of the water line to provide a regenerating operational mode in which the water is directed through said media tank for regeneration purposes, said switching means adapted to repeatedly cycle between the water treating and the media regenerating operational modes;
   (c) a storage tank containing a water soluble regenerating agent;
   (d) a shutoff valve in said storage tank;
   (e) a regenerating line connected between said switching means and said shutoff valve;
   (f) a disinfectant dispenser vessel coupled to said regenerating line for enclosingly containing a water soluble disinfectant agent in solid form; and
   (g) said switching means, said dispenser vessel and said shutoff valve cooperatively operative to automatically direct a predetermined amount of water into said storage tank and into said dispenser vessel at the beginning of eacy cycle of the water conditioning operational mode to form a saturated regenerating agent solution and to dissolve a portion of the supply of the water soluble disinfectant agent to form a saturated disinfectant agent solution and cooperatively operative to automatically and subsequently extract said regenerating agent solution from said storage tank and said disinfectant agent solution from said dispenser vessel at the beginning of each cycle of the regenerating operational mode and mix those solutions with the water being directed through said media tank for regenerating purposes.

5. A water treatment apparatus as claimed in claim 4 wherein said disinfectant dispenser vessel comprises:
   (a) a vessel body having an interior compartment for containing the water soluble disinfectant agent in solid form, said vessel body being closed and having a boss formed therein;
   (b) fitting means mounted in the boss of said vessel body for connection to said regenerating line; and
   (c) screen means mounted between said fitting and the interior compartment of said vessel body for retaining undissolved portions of said water soluble disinfectant agent in said vessel body.

6. A water treatment apparatus as claimed in claim 4 wherein said water soluble disinfectant agent is a halogen.

7. A water treating apparatus as claimed in claim 4 wherein said water soluble disinfectant agent is iodine.

8. A water treating apparatus as claimed in claim 4 wherein said disinfectant dispenser vessel comprises:
   (a) a vessel body having an interior compartment for containing the water soluble disinfectant agent, said vessel body being closed and having a boss formed therein;
   (b) a tee mounted in the boss of said vessel body and connected in said regenerating line;
   (c) screen means mounted between said tee and said vessel body for preventing undissolved portions of the disinfectant agent from being extracted therefrom during said regenerating operational mode; and
   (d) an injector nozzle mounted in said tee and oriented therein so that liquid flow in said regenerating line during said regenerating operational mode will produce a reduced static pressure in said vessel body for extracting the regenerating agent solution therefrom.

9. A water treating apparatus as claimed in claim 4 wherein said switching means comprises:
   (a) a flow control valve having a first position for hydraulically coupling said media tank to the water line and supplying water under pressure to said regenerating line during the water conditioning operational mode and a second position for hydraulically isolating said media tank from the delivery segment of the water line and producing a reduced static pressure in said regenerating line during the regenerating operational mode; and
   (b) timing means coupled to said flow control valve for periodically switching said flow control valve between its first and second positions.

10. A water treating apparatus as claimed in claim 4 wherein said shutoff valve comprises:
   (a) a valve body connected to said regenerating line; and
   (b) a float operated plunger valve operatively coupled to said valve body for opening thereof to admit a predetermined amount of water to said storage tank at the beginning of said water conditioning operational mode and subsequently closing said valve body, said float operated plunger valve for opening said valve body to allow flow of the regenerating agent solution to said regenerating line at the beginning of said regenerating operational mode and closing said valve body upon extraction of said regenerating agent solution from said storage tank.

11. A method for disinfecting a water treatment apparatus of the type fixedly mounted between the supply segment and the delivery segment of a pressurized water line, said method comprising the steps of:
   (a) directing water from the supply segment of said water line through said water treatment apparatus to the delivery segment of said water line during a water treating operational mode of said water treatment apparatus and directing a predetermined amount of water into a disinfectant dispenser vessel at the beginning of the water treating operational mode to dissolve a portion of water soluble disinfectant agent in solid form contained therein to form a saturated disinfectant agent solution in said dispenser vessel;
   (b) terminating the water treating operational mode of said water treatment apparatus after step a to provide a regenerating operational mode in which said water treatment apparatus is hydraulically isolated from the delivery segment of said water line and water from the supply segment of said water line is directed through said water treatment apparatus for regenerating purposes;
   (c) extracting the disinfectant agent solution from said dispenser vessel at the beginning of the regenerating operational mode of said water treatment apparatus; and
   (d) mixing the extracted disinfectant agent solution with the water that is being directed through said water treatment apparatus for regenerating purposes to complete the disinfection of said water treatment apparatus.

12. A method for disinfecting a water treatment apparatus as claimed in claim 11 and including the further steps:
   (I) continuing the direction of water through said water treatment apparatus for regeneration purposes for a predetermined time subsequent to step d for complete purging of the disinfectant agent solution from said water treatment apparatus; and
   (II) returning said water treatment apparatus to the the water treating operational mode of step a subsequent to step I.

13. A method for disinfection of a water treatment apparatus as claimed in claim 12 and including the further step of repeating steps b through d and I and II at predetermined intervals for periodically disinfecting said water treatment apparatus.

* * * * *